United States Patent Office 3,410,292
Patented Nov. 12, 1968

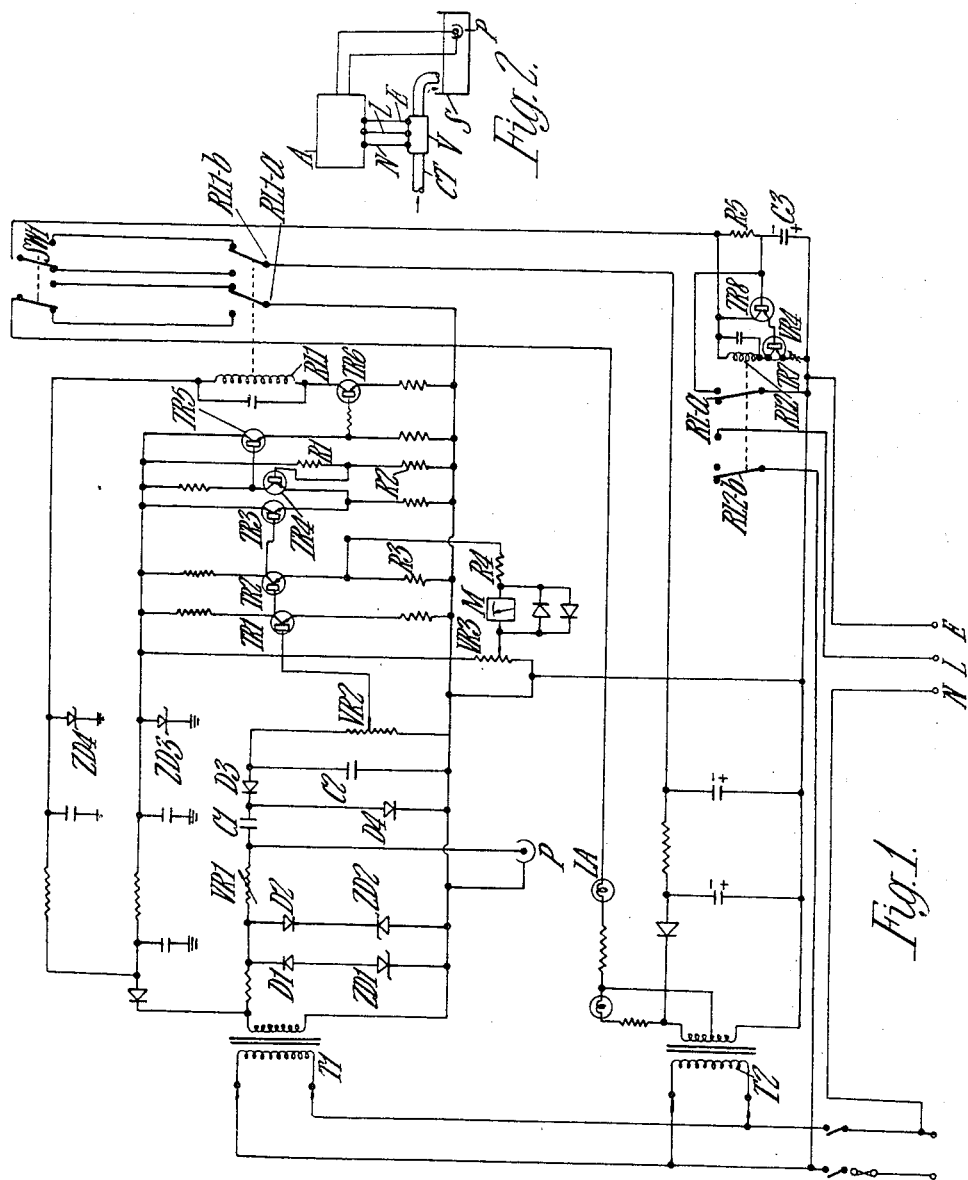

3,410,292
APPARATUS FOR DETECTING OR MEASURING THE CONDUCTIVITY OF A LIQUID
Cyril Frederick Bennett and Charles Stephen Etherton, Brentwood, Essex, England, assignors to N.V. Tools Limited, Brentwood, England, a company of England
Filed June 2, 1965, Ser. No. 460,675
Claims priority, application Great Britain, June 2, 1964, 22,714/64
2 Claims. (Cl. 137—93)

ABSTRACT OF THE DISCLOSURE

An apparatus for detecting or measuring the conductivity of a liquid whereby a probe senses and transmits a signal representative of the condition of the liquid via a pulsed square wave which is applied to a potential divider the output of which actuates the control means.

This invention relates to apparatus for detecting or measuring the electrical conductivity of a liquid and to a control system including such apparatus for the purpose of regulating the conductivity or pH value of a liquid by monitoring its conductivity, and then controlling the addition of one or more components to the liquid in order to maintain the liquid at, or to restore it to, a desired conductivity or pH value.

It is an object of the present invention to provide an improved apparatus and control system for these purposes.

The present invention consists in apparatus for detecting or measuring the conductivity of a liquid, which includes a probe locatable in the liquid and responsive to the conductivity thereof, means for deriving an electrical control signal in accordance with the conductivity detected by the probe, and means for producing an intermittent output signal when said control signal indicates that the conductivity of the liquid has departed from a predetermined value.

The invention further consists in a control system for the purpose indicated, which includes a probe locatable in the liquid and responsive to the conductivity thereof, means for deriving an electrical control signal in accordance with the conductivity detected by the probe, means for producing an intermittent output signal when said control signal indicates that the conductivity of the liquid has departed from a predetermined value, and control means for intermittently introducing a component into the liquid only when a departure has been detected, said component tending to restore the conductivity of the liquid to its predetermined value.

In the accompanying drawings:

FIGURE 1 shows a circuit diagram of apparatus according to the present invention, and FIGURE 2 shows the application of the apparatus of FIGURE 1 in a control system.

In carrying the invention into effect according to one convenient mode by way of example, FIGURE 1 shows apparatus for detecting or measuring the conductivity of a liquid, which includes a probe P locatable in the liquid, the probe P constituting a conductivity cell.

The probe P is connected to a variable resistor VR1 to form a potential divider energized with alternating current from the secondary winding of transformer T1. This secondary winding is arranged to deliver 13 volts but two series combinations of diode D1 and Zener diode ZD1, and diode D2 and Zener diode ZD2, respectively, are connected in parallel across the winding so that both the positive and negative excursions of the waveform are limited to a maximum of 6 volts. In this way, an approximately square waveform of constant amplitude is applied to the potential divider, the waveform being independent of variations in the mains supply to the transformer T1 up to about ±40%.

The output of the potential divider, which depends upon the resistance of the probe P and thus the conductivity of the liquid, is fed through capacitor C1 to diodes D3 and D4 and capacitor C2. Diode D3 shorts the positive half-cycles to earth and the negative half-cycles charge capacitor C2 across which is connected a variable resistor VR2.

The D.C. signal from the slider of variable resistor VR2 is amplified by transistors TR1 and TR2 and fed to an emitter follower stage including transistor TR3. Up to this point the D.C. signal includes a standing potential and the amplified signal, but to eliminate the former the output from transistor TR3 is coupled through a common emitter arrangement to transistor TR4 working as a grounded base amplifier. Resistors R1 and R2 provide base bias to eliminate the standing potential and leave the amplified signal.

The signal is then fed into an emitter follower stage including transistor TR5 and thence to output transistor TR6 arranged to energize relay RL1.

The circuit is arranged so that when the conductivity of the liquid falls to a certain level, the potential at the slider of variable resistor VR1 will be sufficient to cause the amplifier to conduct and thus energize relay RL1. The level of conductivity at which this happens can be set as desired by adjustment of variable resistor VR2.

Two separately regulated D.C. supplies are provided, one including Zener diode ZD3 to supply the D.C. amplifier and one including Zener diode ZD4 to supply the output transistor TR6.

A meter M is connected to the emitter of transistor TR3 in a bridge network consisting of variable resistor VR3, resistors R3 and R4 and transistor TR2 to indicate conductivity when the D.C. amplifier is conducting. The variable resistor VR3 is used to adjust the extremities of the scale in relation to the operating point.

With the switch SW1 in the position shown in the drawing, it will be seen that when relay RL1 is operated its contacts RL1-a cause indicator lamp LA to be energized, and its contacts RL1-6 cause a D.C. supply from transformer T2 to be applied to a pulsing amplifier. When the switch is changed over to its other position release of the relay RL1 will cause energization of the lamp LA and pulsing amplifier. In the former position of the switch, the pulsing amplifier will be energized when the conductivity is below a desired level and in the latter position when the conductivity rises above a desired level. In this way the apparatus can be used conveniently in a control system either when the conductivity falls and action must be taken to increase it, or vice versa.

The pulsing amplifier consists essentially of two transistors TR7 and TR8, a relay RL2 and a capacitor C3. When energized by contacts RL1-b, capacitor C3 is charged through resistor R5 to drive the base of transistor TR8 negative and operate transistor TR7 to energize relay RL2. When contacts RL2-a close, the capacitor C3 is discharged, TR7 and TR8 are cut off, and relay RL2 releases, thereby restoring the original condition. Relay RL2 is thus operated intermittently, and variable resistor VR4 connected to the emitter of TR7 can be adjusted to vary the rate.

The output on terminal L can be connected to contacts RL2-6 so that an output is present either when the relay RL2 is energized or de-energized.

One particular application of the apparatus of FIGURE 1 is in a control system for maintaining approximately constant the pH value of a fountain solution used in a lithographic printing process, by controlling the addition of phosphoric acid into the solution to counteract the tendency of the solution to turn alkaline during use.

As shown diagrammatically in FIGURE 2, the probe P of the apparatus A is immersed in the fountain solution S and the output of the apparatus A is connected to a solenoid valve V for controlling the addition of phosphoric acid from a main supply to the solution S through conduit $C^T$.

When the conductivity of the solution changes to indicate that the desired pH value of the solution has been exceeded, and thus phosphoric acid is required, the apparatus operates to provide an output which thus operates the valve V to add acid intermittently until the pH value has fallen to its desired level.

In one typical arrangement, the apparatus provides, under conditions when correction is required, an output pulse of 0.05 second duration at intervals adjustable over the range between 30 and 45 seconds.

What we claim is:

1. A control system for the purpose of regulating the electrical conductivity of a liquid, which includes a probe located in the liquid and responsive to the conductivity thereof, means for continuously deriving an electrical control signal in accordance with the conductivity detected by the probe comprising a resistor connected to the probe to form a potential divider, an alternating current supply, means for limiting the amplitude of the output of the said supply whereby there is obtained an approximately square wave of constant amplitude, means for applying said approximately square wave to said potential divider, and means for rectifying the output of the potential divider to produce said electrical control signal, means for producing an intermittent output signal when said control signal indicates that the conductivity of the liquid has departed from a predetermined value, means for supplying an additive whose electrical conductivity is such as to tend to restore the conductivity of the liquid to its predetermined value, and control means for intermittently introducing quantities of the component into the liquid whenever a departure from the predetermined value has been detected.

2. A control system according to claim 1, which further comprises switch means operable selectively to cause operation of the control means either when the electrical conductivity of the liquid exceeds the predetermined value for situations where the conductivity of the additive is such as to lower the conductivity of the liquid or alternatively when it is less than the predetermined value for situations where the conductivity of the additive is such as to raise the conductivity of the liquid.

References Cited

UNITED STATES PATENTS

| | | | |
|---|---|---|---|
| 2,221,306 | 11/1940 | Christie | 137—93 XR |
| 2,377,363 | 6/1945 | Noble | 137—93 |
| 2,586,169 | 2/1952 | Kline | 137—93 XR |
| 2,588,981 | 3/1952 | Hole | 137—93 XR |
| 2,632,144 | 3/1953 | Borell | 137—93 XR |
| 2,726,670 | 12/1955 | Staunton | 137—93 |
| 3,005,554 | 10/1961 | Kuntz | 210—96 |

WILLIAM F. O'DEA, *Primary Examiner.*

WILLIAM H. WRIGHT, *Assistant Examiner.*